United States Patent [19]

Mauer

[11] Patent Number: 5,068,093

[45] Date of Patent: Nov. 26, 1991

[54] METHOD FOR PRODUCING TITANIUM DIOXIDE

[75] Inventor: Josef Mauer, Leverkusen, Fed. Rep. of Germany

[73] Assignee: Sulzer-Escher Wyss AG, Zurich, Switzerland

[21] Appl. No.: 273,439

[22] Filed: Nov. 17, 1988

[30] Foreign Application Priority Data

Nov. 23, 1987 [CH] Switzerland .............. 04548/87

[51] Int. Cl.$^5$ ............................................. C01G 23/04
[52] U.S. Cl. ...................................... 423/82; 423/610; 423/85
[58] Field of Search ............... 423/82, 85, 610, 615, 423/616, DIG. 2

[56] References Cited

U.S. PATENT DOCUMENTS

| 2,774,650 | 12/1956 | Oppegaard | 423/82 |
| 3,218,131 | 11/1965 | Grose | 423/85 |
| 3,533,742 | 10/1970 | Oster | 423/610 |
| 3,868,441 | 2/1975 | Agee et al. | 423/615 |
| 4,013,755 | 3/1977 | Weiler et al. | 423/615 |
| 4,038,363 | 7/1977 | Jarish | 423/610 |
| 4,119,698 | 10/1978 | Zimmer et al. | 423/85 |
| 4,169,054 | 9/1979 | Cappello et al. | 23/304 |
| 4,288,416 | 9/1981 | Davis et al. | 423/82 |
| 4,304,758 | 12/1198 | Rieck et al. | 423/82 |
| 4,313,913 | 2/1982 | Panek et al. | 423/82 |
| 4,321,237 | 3/1982 | Panek et al. | 423/82 |
| 4,663,131 | 5/1987 | Gerken et al. | 423/82 |

FOREIGN PATENT DOCUMENTS

| 609030 | 11/1960 | Canada | 423/82 |
| 673236 | 10/1963 | Canada | 423/82 |
| 0031062 | 7/1981 | European Pat. Off. | 423/82 |
| 0031064 | 7/1981 | European Pat. Off. | 423/82 |
| 0031507 | 7/1981 | European Pat. Off. | . |
| 0197473 | 10/1986 | European Pat. Off. | 423/610 |
| 0197507 | 10/1986 | European Pat. Off. | 423/610 |
| 0220583 | 5/1987 | European Pat. Off. | . |
| 2729755 | 1/1979 | Fed. Rep. of Germany | 423/82 |
| 2807380 | 3/1979 | Fed. Rep. of Germany | . |
| 2807394 | 3/1979 | Fed. Rep. of Germany | . |
| 2807360 | 4/1979 | Fed. Rep. of Germany | . |
| 673200 | 6/1952 | United Kingdom | 423/82 |
| 710065 | 6/1954 | United Kingdom | 423/82 |
| 1037399 | 7/1966 | United Kingdom | 423/85 |
| 1241963 | 8/1971 | United Kingdom | 423/610 |
| 2004469 | 4/1979 | United Kingdom | . |

OTHER PUBLICATIONS

Copy of "Materialien 2/76 Umweltbundesamt" entitled Materialien zum Abfallwirtschaftsprogramm '75 der Bundesregierung—Rückstände aus der Titandioxid—Produktion—Stand: Dec. 1981.
Pp. 570 to 582 of "Pigmente, weiss", Band 18.

Primary Examiner—Michael L. Lewis
Assistant Examiner—Steven Bos
Attorney, Agent, or Firm—Sandler, Greenblum & Bernstein

[57] ABSTRACT

Titanium slag and ilmenite are subjected to a parallel treatment with sulphuric acid obtained by mixing different proportions of sulphuric acid having concentrations of about 98.5% by weight and about 85% by weight, respectively. The reaction mixtures have a temperature slightly below a predetermined starting temperature and the reactions are started by adding small quantities of superheated steam having a temperature above the predetermined starting temperature. The thus obtained solutions are separated from the respective treatment residues and combined. The combined solutions are further processed for obtaining titanium dioxide. The mother liquor constitutes sulphuric acid of a concentration in the range of about 23% by weight and containing metal sulphates. This mother liquor is concentrated to a sulphuric acid concentration of approximately 85% by weight and recycled. The obtained metal sulphates are roasted and the roast gases further processed to obtain highly concentrated sulphuric acid which is recycled to the titanium slag treatment whereas the excess recycled about 85% sulphuric acid constitutes the main component used for the ilmenite treatment. The weak acid obtained from the mother liquor thus is almost entirely re-used in an economical manner.

8 Claims, 1 Drawing Sheet

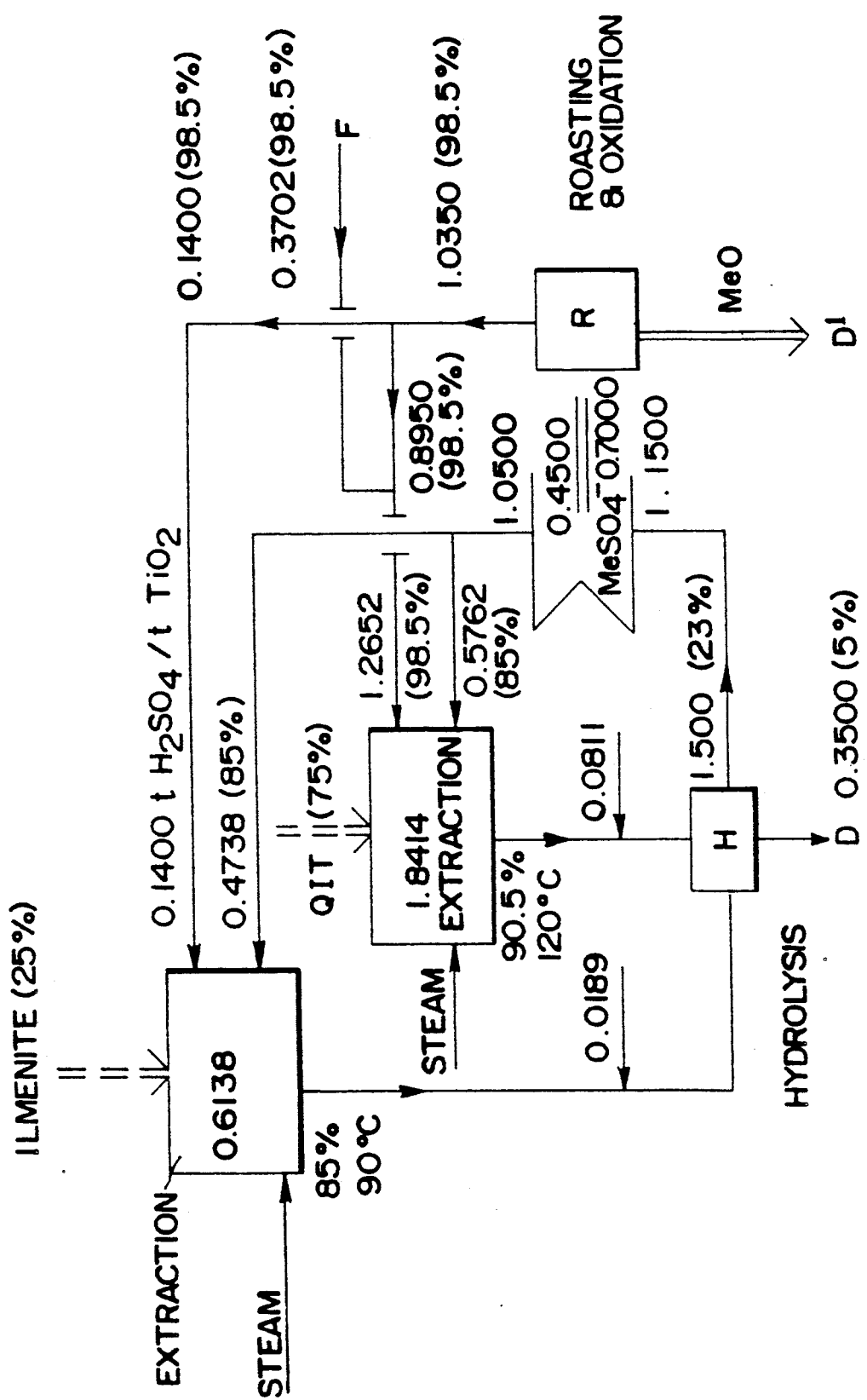

METHOD FOR PRODUCING TITANIUM DIOXIDE

BACKGROUND OF THE INVENTION

The present invention relates to a new and improved method of producing titanium dioxide.

In its more particular aspects, the present invention relates to a new and improved method for producing titanium dioxide and during which method titanium slag is used as the starting material and mixed with sulphuric acid having a concentration of at least 95% by weight. Warm, concentrated sulphuric acid of a concentration less than 95% by weight is obtained from a recycling operation during the titanium dioxide production and is subsequently added to the mixture of titanium slag and the highly concentrated sulphuric acid. As a result of such treatment or extraction operation, there is obtained a solution which is suitable for the hydrolysis of the titanyl sulphate which is contained therein, after separation of the solution from the titanium slag treatment residue. This solution is subjected to hydrolysis and the hydrolysis product which is further processed for producing the desired titanium dioxide, is separated from the mother liquor. The mother liquor constitutes a weak sulphuric acid containing metal sulphates. This mother liquor is concentrated to a sulphuric acid concentration in the range of 76% by weight to 87% by weight and recycled into the titanium slag treatment. The metal salts or sulphates are separated from the mother liquor during the concentrating operation.

A method such as known, for example, from "Ullmanns Encyklopädie der technischen Chemie", 4th Edition (1979), Volume 18, pages 570 to 580, utilizes ilmenite containing relatively high amounts of iron or titanium slag as the starting material for producing titanium dioxide. The titanium slag is particularly advantageous and obtained from ilmenite by separation of the iron contained therein.

According to a further known method using titanium slag as the starting material, such as the method described, for example, in European Patent Publication No. 0,197,507, published Oct. 15, 1986, the ecologically harmful dumping or open sea disposal of the large quantities of low concentration waste sulphuric acid and metal salts are intended to be avoided. Such low concentration sulphuric acid and metal salts are obtained as by-products during the titanium dioxide production using the sulphuric acid treatment of titanium slag. The dumping or open sea disposal of these by-products are avoided by reprocessing the low concentration waste sulphuric acid and recycling the same to the greatest possible extent for re-use in the sulphuric acid treatment of the titanium slag.

The titanium slag treatment requires high starting concentrations of sulphuric acid of approximately 90% by weight and temperatures of approximately 120° C. Since the mother liquor from the hydrolysis has a sulphuric acid concentration of approximately 23% by weight, this weak sulphuric acid must be concentrated to a very high extent and any disturbing metallic compounds or metal sulphates have to be separated during such concentrating operation. Appropriate methods are listed in "Materialien 2/76, Rükstände aus der Titandioxid-Produktion" (Roughly translated as: Materials 2/76, Residues from Titanium Dioxide Production), issued by the German Federal Environment Office (Umweltbundesamt), Berlin 1982, and are also known, for example, from German Patent Publication No. 2,807,380, published Mar. 29, 1979, German Patent Publication No. 2,807,394, published Mar. 29, 1979, and German Patent Publication No. 2,807,360, published Apr. 19, 1979.

When utilizing such methods, the concentration of the sulphuric acid obtained during the concentrating operation, must increase with increasing amounts of recovered sulphuric acid which are intended to be recycled. In such case, the starting concentration of sulphuric acid must be obtained by adding the required amount of still higher concentrated fresh sulphuric acid having a concentration above 95% by weight. However, particularly high final concentrations in the concentrating operation can only be realized at high energy consumption which is undesirable and also renders the method uneconomical. Consequently, the known processes do not yet operate at an optimum extent of sulphuric acid recycling in a simultaneously economical and energy-saving manner, i.e. either only a limited amount of the weak sulphuric acid, which is obtained as a result of the hydrolysis, can be recycled or the recycled sulphuric acid must be concentrated in an uneconomical manner.

In a further method such as known, for example, from European Patent Publication No. 0,031,507, published July 8, 1981, a mixture of titanium slag and ilmenite is treated or extracted using sulphuric acid having a concentration in the range of 86% by weight to 96% by weight. In order to enable re-use of a large quantity of the weak sulphuric acid, which is obtained as a result of the hydrolysis such weak sulphuric acid must be concentrated to very high concentrations in an energy-intensive manner and, preferably, fuming sulphuric acid from an external source has to be added.

In a still further method as described, for example, in European Patent Publication No. 0,220,583, published May 6, 1987, the weak sulphuric acid obtained from the method of producing titanium dioxide, is concentrated to sulphuric acid having a concentration in the range of 70% by weight to 85% by weight. Such recovered sulphuric acid is mixed with sulphuric acid having a concentration above 95% by weight, preferably fuming sulphuric acid from an external source, for re-use in the treatment or extraction of the starting material. This method also does not recycle the weak sulphuric acid in an optimum manner and with optimum energy consumption.

SUMMARY OF THE INVENTION

Therefore, with the foregoing in mind, it is a primary object of the present invention to provide a new and improved method for producing titanium dioxide and which method is not afflicted with the aforementioned drawbacks and limitations of the prior art methods.

Another and more specific object of the present invention is directed to a new and improved method for producing titanium dioxide and which method permits recovering and re-using or recycling significantly increased portions of the obtained waste products in the method as compared with prior art methods.

A further important object of the present invention is directed to providing a new and improved method for producing titanium dioxide and which method renders possible recycling a significantly increased amount of sulphuric acid with concomitant improvements in the economy of the process and savings of energy as compared with prior art methods.

Now in order to implement these and still further objects of the invention, which will become more readily apparent as the description proceeds, the method of the present development is manifested, among other things, by the steps that, ilmenite and titanium slag are subjected to parallel sulphuric acid treatments or extractions. The thus obtained titanium-containing solutions are subsequently mixed or combined and further processed to yield the desired titanium dioxide. The mother liquor thus obtained from the titanium dioxide production constitutes a weak or dilute sulphuric acid which is concentrated and recycled into the parallel treatments or extractions. The metal sulphates obtained from the concentrating operation are further processed for producing highly concentrated sulphuric acid which is also recycled into the parallel treatments or extractions of the starting materials ilmenite and titanium slag.

Advantageously, the sulphuric acid recovered from the mother liquor is recycled into the process such that mainly the recovered sulphuric acid is used for the ilmenite treatment or extraction. The recovered highly concentrated sulphuric acid is recycled into the treatment or extraction of titanium slag.

Preferably, the ratio of the amounts of titanium slag and ilmenite, as well as the proportions of recycled sulphuric acid and highly concentrated sulphuric acid used in the parallel titanium slag treatment or extraction and ilmenite treatment (or extraction), are selected such as to obtain predetermined starting conditions for the treatment or extraction of these starting materials. If required, such starting conditions can be realized by the additional introduction of steam, particularly superheated steam.

In this respect, the inventive method is based on the recognition that the starting conditions for the treatment or extraction of titanium slag differ from the starting conditions for the treatment or extraction of ilmenite. Such starting conditions for example, are a sulphuric acid concentration of approximately 90% by weight and 120° C. in the case of titanium slag. In the case of ilmenite, the starting conditions, for example, are a sulphuric acid concentration of approximately 85% by weight and a temperature of about 90° C.

Under such starting conditions, the recovered and recycled sulphuric acid which is obtained in comparatively large quantities as a result of the titanium slag treatment or extraction, needs to be concentrated only to about 85% by weight which results in a considerable saving of energy. There is thus permitted using mainly the recovered and recycled sulphuric acid for the ilmenite treatment or extraction. The remaining portion of the recovered and recycled sulphuric acid, then, can be readily brought to the required starting condition of approximately 90% by weight by adding highly concentrated sulphuric acid having a concentration of about 98.5% by weight. It should be noted in this respect that a considerable portion of such highly concentrated sulphuric acid can also be recovered, as mentioned hereinbefore, by roasting the obtained metal sulphates and converting the roast gases into sulphuric acid. After all, there is thus obtained the beneficial effect that a large amount of the sulphuric acid can be recovered and recycled in a less than highly concentrated condition and thus at very favorable use of energy.

BRIEF DESCRIPTION OF THE DRAWINGS

The invention will be better understood and objects other than those set forth above will become apparent when consideration is given to the following detailed description thereof. Such description makes reference to the annexed single drawing showing a block diagram of the inventive process.

DETAILED DESCRIPTION OF THE PREFERRED EMBODIMENTS

Describing now the drawing, it is to be understood that to simplify the showing thereof, only enough of the method for producing titanium dioxide has been illustrated in the manner of a flow diagram as is needed to enable one skilled in the art to readily understand the underlying principles and concepts of the present development, while simplifying the showing of the drawing. Turning attention now specifically to the single figure of the drawing, there has been illustrated therein by way of example and not limitation, a block or flow diagram illustrating the various steps which are required when carrying out the inventive method for producing titanium dioxide. In such block or flow diagram there are given numerical values showing the amounts of 100% sulphuric acid which are employed or obtained during the various steps of the inventive method, each such numerical value being given in metric tons related to the production of 1 metric ton of titanium dioxide. The percentage data given in parentheses indicate the actually used or obtained concentrations of sulphuric acid. The indicated percentages are to be understood as percentages by weight throughout.

When performing the inventive method, there are carried out parallel treatments or extractions of ilmenite, for example, an Australian ilmenite ore, and titanium slag, for example, Canadian titanium slag obtained from the Quebec Iron and Titanium Corporation and which titanium slag is designated by the reference character QIT. Such titanium slag is preferably used in the ground state or condition.

Preferably, the employed ilmenite contains iron as a foreign substance, whereas the titanium slag contains only small quantities of iron but greater proportions of other metals like, for example, aluminum and magnesium.

Surprisingly, the parallel treatment or extraction of the aforementioned two starting materials at a predetermined ratio thereof and the subsequent combined processing of the titanium-containing solutions obtained from such treatment after separation from the respective residues, results in considerable improvements in the recycling and re-use of waste products as well as in the economy of the titanium dioxide production.

In the illustrated example, the ilmenite and the titanium slag are used as starting materials in a 25%:75% ratio. Specifically, the Australian ilmenite contains titanium dioxide in an amount of about 54.5% by weight and the QIT titanium slag contains titanium dioxide in an amount of about 78% by weight. At an overall yield of about 87.5% titanium dioxide from the two parallel treatments or extraction, about 1.55 metric tons of sulphuric acid (100% concentration) are required for each metric ton of the ore. In other words, for each ton of titanium dioxide which is produced by the inventive method, there is required a total amount of 2.4552 metric tons of sulphuric acid, namely 0.6138 metric tons for the treatment or extraction of ilmenite and 1.8414 metric tons for the treatment or extraction of the QIT titanium slag, each in 100% concentration per metric ton of titanium dioxide.

For the ilmenite treatment or extraction, 0.14 metric tons of 100% sulphuric acid are used in the azeotropic state corresponding to a concentration of 98.5% and added to the ground ilmenite ore. This azeotropic sulphuric acid is recovered and recycled by processing the metal sulphates which are obtained as a by-product when carrying out the inventive method, as will be described further hereinbelow. Subsequently, 0.4738 metric tons of 100% sulphuric acid are added at a temperature preferably below 80° C. and at a concentration of about 85% by weight. Such 85% sulphuric acid is recycled as recovered from the mother liquor of the titanium dioxide production as described further hereinbelow.

As a result of the addition of the 85% sulphuric acid, there is obtained a mixture of the ilmenite ore with sulphuric acid having a concentration of approximately 87.7% by weight and a temperature of approximately 75° C. In order to provide the predetermined starting conditions for the ilmenite treatment or extraction, there are added 0.0226 metric tons of steam, for example, superheated steam at a temperature of about 150° C. There thus result the required starting conditions for the ilmenite treatment or extraction, namely a sulphuric acid having a concentration of approximately 85% by weight and a temperature of about 90° C. During the further course of the operation, there is required a further addition of 0.0189 metric tons of 100% sulphuric acid for the purpose of bleaching.

The parallel treatment or extraction of the QIT titanium slag is effected by adding 0.8950 metric tons of 100% sulphuric acid at a concentration of about 98.5% to the preferably ground titanium slag in a cooled mixing vessel. This amount of highly concentrated sulphuric acid is obtained from the processing of the metal sulphates as described further hereinbelow. An additional amount of 0.3702 metric tons of 100% sulphuric acid in the form of fresh cold sulphuric acid of a concentration of about 98.5% is added. Subsequently, the thus obtained mixture is transferred to a reaction tank and there are added 0.5762 metric tons of 100% sulphuric acid in the form of the aforementioned recovered and recycled 85% sulphuric acid at a temperature preferably below 80° C. As a result, there is obtained a reaction mixture containing sulphuric acid at a concentration of about 93.8% by weight and having a temperature of approximately 75° C. The predetermined starting conditions for treating or extracting the QIT titanium slag are obtained by adding 0.0723 metric tons of steam, for example, superheated steam at about 150° C. As a result of such addition, the concentration of sulphuric acid is adjusted to about 90% by weight and the temperature is adjusted to about 120° C. During the further course of the operation, a further 0.0811 metric tons of 100% sulphuric acid are added for bleaching purposes.

After completing the parallel ilmenite and QIT titanium slag treatments or extractions, the thus obtained respective titanium-containing solutions are separated from the ilmenite treatment residue and the QIT titanium slag treatment residue. The two titanium-containing solutions are combined and the combined solutions are further subjected to hydrolysis in conventional manner, as indicated by the box designated by the reference character "H" in the block or flow diagram illustrating the inventive method. The thus obtained hydrolysis product is separated from the mother liquor and dissolved in conventional manner in water or dilute acid at a low temperature and, as a result, the titanium oxide hydrate is dissolved and there remains a residue of insoluble metal sulphates. The aforementioned mother liquor contains 1.5 metric tons of 100% sulphuric acid at a concentration of 23% by weight.

The separated solution is again subjected to hydrolysis and the precipitated titanium oxide hydrate is separated from the liquid. The filter cake is washed and dehydrated and during this process there are produced 0.3500 metric tons of 100% sulphuric acid at a concentration of approximately 5% by weight which is conveniently designated by the reference character D and disposed of because further processing thereof would be uneconomical.

The aforementioned mother liquor which constitutes metal salt or sulphate containing weak or dilute sulphuric acid having a concentration of approximately 23% by weight, is subjected to a conventional concentrating operation in order to obtain the aforementioned recovered 85% sulphuric acid.

As illustrated in the block or flow diagram, the thus recovered approximately 1.0500 metric tons of 100% sulphuric acid are recycled into the parallel treatments or extractions of ilmenite and QIT titanium slag. Specifically, and as illustrated, 0.5762 metric tons thereof are employed for the QIT titanium slag treatment or extraction and 0.4738 metric tons thereof are utilized for the ilmenite treatment or extraction.

During the concentrating operation on the abovementioned mother liquor, there is obtained an amount of approximately 0.7000 metric tons of metal sulphates which contain a residual amount of approximately 0.4500 metric tons of 100% sulphuric acid. The thus obtained metal sulphates are subjected to a conventional roasting process which is indicated by the block "R" in the block or flow diagram. During such roasting process, the metal sulphates are converted into metal oxides and the roast gases are converted in conventional manner to 1.0350 metric tons of 100% sulphuric acid in the azeotropic condition at a concentration of 98.5%. This sulphuric acid is recovered and recycled into the parallel treatments or extractions of ilmenite and QIT titanium slag.

As indicated by the labels "MeO" and $D^1$ in the block or flow diagram, the metal oxides designated by "MeO" and which are the product of the roasting operation, are outfed at $D^1$ for disposal or further processing.

As illustrated in the example of the block or flow diagram, 0.1400 metric tons of the recovered 100% sulphuric acid are utilized for the ilmenite treatment or extraction and 0.8950 metric tons of such recovered 100% sulphuric acid are utilized for the QIT titanium slag treatment or extraction. Only 0.3702 metric tons of fresh 100% sulphuric acid, also in the form of 98.5% sulphuric acid, have to be introduced for replacing losses and this make-up quantity "F" amounts to only about 15% of the entire quantity of sulphuric acid required for producing 1 metric ton of titanium dioxide.

The parallel treatment or extraction of ilmenite and QIT titanium slag according to the inventive method advantageously requires only a sulphuric acid concentration of approximately 85% by weight and a temperature of approximately 90° C. as a starting condition for the treatment or extraction of ilmenite as compared to a sulphuric acid concentration of approximately 90% by weight and a temperature of about 120° C. as in the starting conditions for the treatment or extraction of QIT titanium slag. Therefore, in the ilmenite treatment or extraction, there can be used a comparatively large proportion (e.g. 0.4738 tons) of the recovered and recycled 85% sulphuric acid in relation to only a comparatively small amount (e.g. 0.1400 tons) of highly concentrated 98.5% sulphuric acid. The major portion of the recovered and recycled highly concentrated 98.5% sulphuric acid (e.g. 1.2652 tons) thus is available for the QIT titanium slag treatment or extraction where only a relatively smaller quantity (e.g. 0.5762 tons) of the recovered and recycled 85% sulphuric acid can be added. Consequently, such parallel treatment or extraction permits a significantly increased degree of using recovered and recycled products in an energy-saving and economical manner, particularly, in the absence of a requirement for increasing the weak or dilute 23% sulphuric acid to concentrations above 85% by weight and at conditions under which only a considerably reduced amount of fresh highly concentrated sulphuric acid is required.

The herein given individual numerical values are related to the specific starting materials which are utilized for carrying out the inventive method. Such individual numerical values are subject to change in accordance with changes in the origin of the starting materials. In any event, the inventive concept is also applicable to, for example, South African, Canadian, Norwegian or Australian titanium slag or ilmenite with appropriate adaptation of the sulphuric acid quantities to the respective titanium slag and ilmenite compositions without any substantive change in the parameters of the inventive method.

While there are shown and described present preferred embodiments of the invention, it is to be distinctly understood that the invention is not limited thereto, but may be otherwise variously embodied and practiced within the scope of the following claims.

Accordingly, what I claim is:

1. A method of producing titanium dioxide, comprising the steps of:
   (1) selecting titanium slag and ilmenite as titanium-containing starting materials in a defined ratio;
   (2) during a parallel treatment, reacting said titanium slag with sulphuric acid and separately reacting said ilmenite with sulphuric acid;
   (3) said step of reacting said titanium slag during said parallel treatment with the sulphuric acid entailing the steps of:
      (i) mixing said titanium slag with highly concentrated sulphuric acid having a concentration of at least 95% by weight;
      (ii) adding to the thus obtained mixture, less concentrated sulphuric acid having a concentration in a range of 76% by weight to 87% by weight;
      (iii) reacting said mixture containing said added less concentrated sulphuric acid and thereby obtaining a titanium-containing solution;
      (iv) separating said titanium-containing solution from a titanium slag treatment residue;
   (4) said step of reacting said ilmenite with sulphuric acid during said parallel treatment entailing the steps of:
      (i) mixing said ilmenite with highly concentrated sulphuric acid having a concentration of at least 95% by weight;
      (ii) adding to the thus obtained mixture, less concentrated sulphuric acid having a concentration in a range of 76% by weight to 98% by weight;
      (iii) reacting said mixture containing said added less concentrated sulphuric acid and thereby obtaining a titanium-containing solution;
      (iv) separating said titanium-containing solution from an ilmenite treatment residue;
   (5) combining the titanium-containing solutions separated from said titanium slag treatment residue and said ilmenite treatment residue;
   (6) hydrolysing the thus obtained combined titanium-containing solutions and thereby obtaining a titanium-containing hydrolysis product and a other liquor constituting a metal sulphate containing dilute sulphuric acid;
   (7) separating said titanium-containing hydrolysis product from said mother liquor;
   (8) recovering titanium dioxide from said titanium-containing hydrolysis product;
   (9) concentrating said mother liquor and thereby recovering sulphuric acid having a concentration in the range of 76% by weight to 87% by weight;
   (10) during said step of concentrating said mother liquor, separating metal sulphates from said mother liquor;
   (11) recycling said recovered sulphuric acid having said concentration in the range of 76% by weight to 87% by weight into said parallel treatment and
      (i) utilizing part of said recovered sulphuric acid during said step of adding said sulphuric acid having said concentration in the range of 76% by weight to 87% by weight to said mixture of titanium slag and highly concentrated sulphuric acid having a concentration of at least 95% by weight;
      (ii) utilizing a further part of said recovered sulphuric acid during said step of adding said sulphuric acid having said concentration in the range of 76% by weight to 87% by weight to said mixture of ilmenite and highly concentrated sulphuric acid having a concentration of at least 95% by weight;
   (12) during said parallel treatment, utilizing as a starting condition for reacting said titanium slag (i) a temperature of about 120° C. and (ii) a ratio of said highly concentrated sulphuric acid having a concentration of at least 95% by weight and said recovered and recycled sulphuric acid having a concentration in the range of 76% by weight to 87% by weight which results in a total sulphuric acid concentration of about 90% by weight; and
   (13) during said parallel treatment, utilizing as a starting condition for reacting said ilmenite (i) a temperature of about 90° C. and (ii) a ratio of said highly concentrated sulphuric acid having a concentration of at least 95% by weight and said recovered and recycled sulphuric acid having a concentration in the range of 76% by weight to 87% by weight which results in a total sulphuric acid concentration of about 85% by weight.

2. The method as defined in claim 1, wherein:
said step of selecting said ratio of the amounts of titanium slag and ilmenite entails selecting as said ratio, a ratio of about 1 to about 3.

3. The method as defined in claim 1, wherein:
during said parallel treatment, introducing steam and thereby generating said starting conditions.

4. The method as defined in claim 3, wherein:
during said step of introducing said steam, introducing superheated steam having a temperature above said temperature of said starting conditions.

5. The method as defined in claim 4, wherein:
during said step of recycling said recovered sulphuric acid, recycling said recovered sulphuric acid at an elevated temperature; and
during said step of selecting said ratio of said highly concentrated sulphuric acid having a concentration of at least 95% by weight and said recovered and recycled sulphuric acid having said concentration in the range of 76% by weight to 87% by weight, recycling said recovered sulphuric acid at an elevated temperature such that said ratio results in a temperature below said temperature of said starting conditions.

6. The method as defined in claim 1, further including the steps of:
roasting said metal sulphates obtained during said step of concentrating said mother liquor and thereby decomposing said metal sulphates to form metal oxides and sulphur dioxide;
oxidizing said sulphur dioxide;
processing said oxidized sulphur dioxide and thereby obtaining recovered highly concentrated sulphuric acid having a concentration greater than 95% by weight; and
recycling said recovered highly concentrated sulphuric acid having said concentration greater than 95% by weight into said parallel treatment of titanium slag and ilmenite.

7. The method as defined in claim 6, further including the step of:
selecting as said highly concentrated sulphuric acid, a sulphuric acid having an azeotropic composition and a concentration of about 98.5% by weight.

8. The method as defined in claim 1, further including the step of:
selecting ground titanium slag as said titanium-containing starting material.

* * * * *